Figure 1:
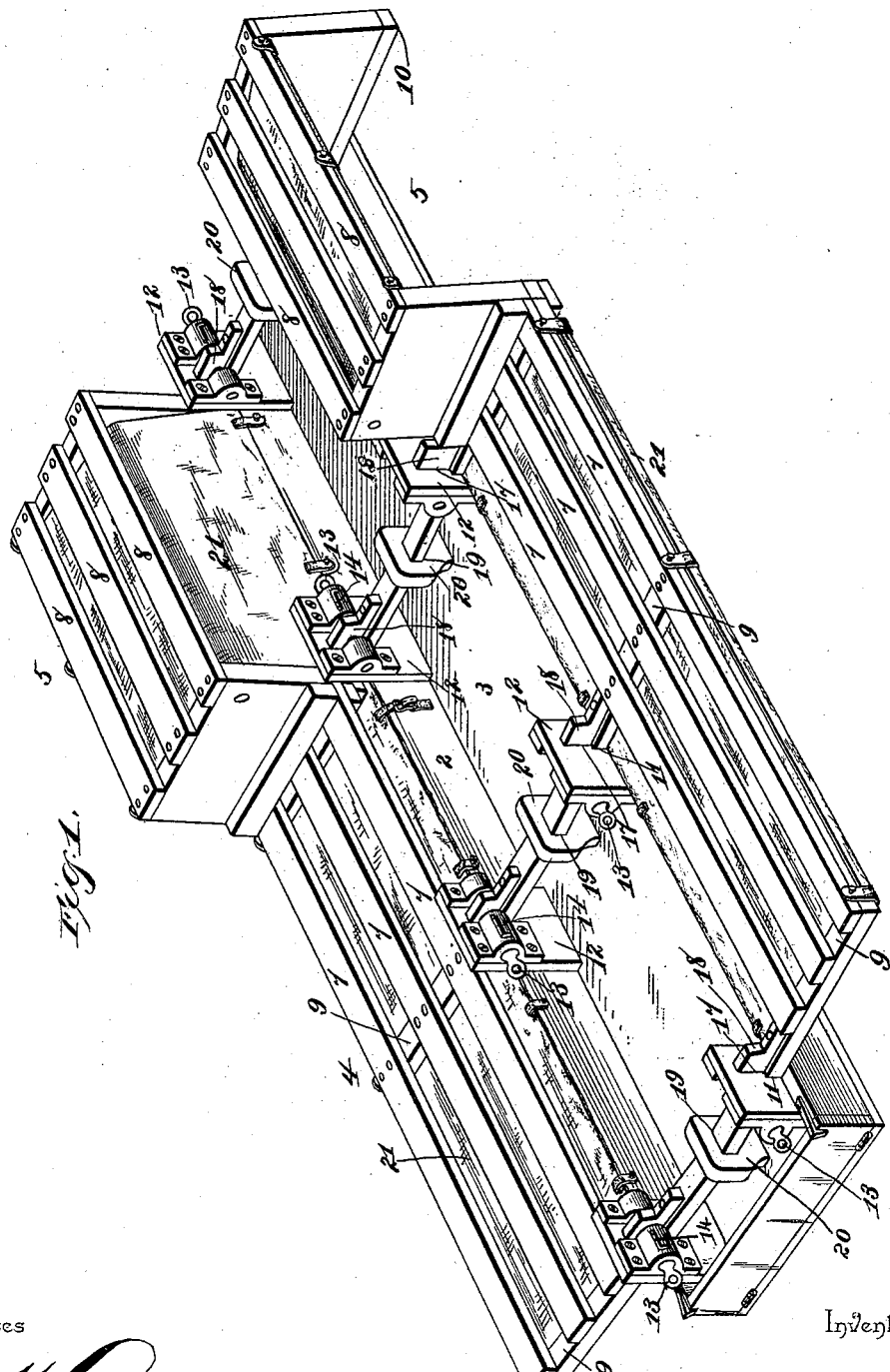

(No Model.) 2 Sheets—Sheet 1.

J. W. SCOTT.
HAY RACK.

No. 494,695. Patented Apr. 4, 1893.

Witnesses
E. C. Wademan
N. T. Riley

Inventor
J. W. Scott
By his Attorneys,
C. A. Snow & Co.

(No Model.) 2 Sheets—Sheet 2.
J. W. SCOTT.
HAY RACK.
No. 494,695. Patented Apr. 4, 1893.
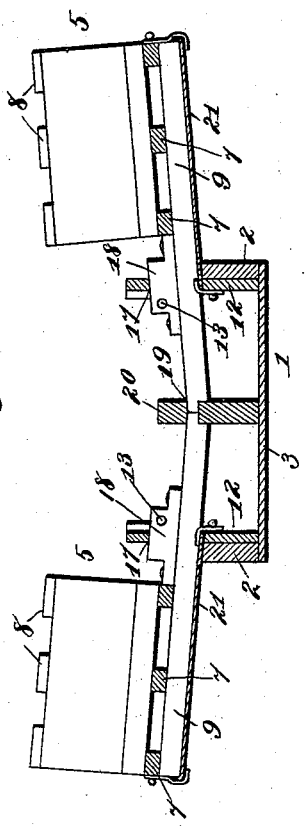
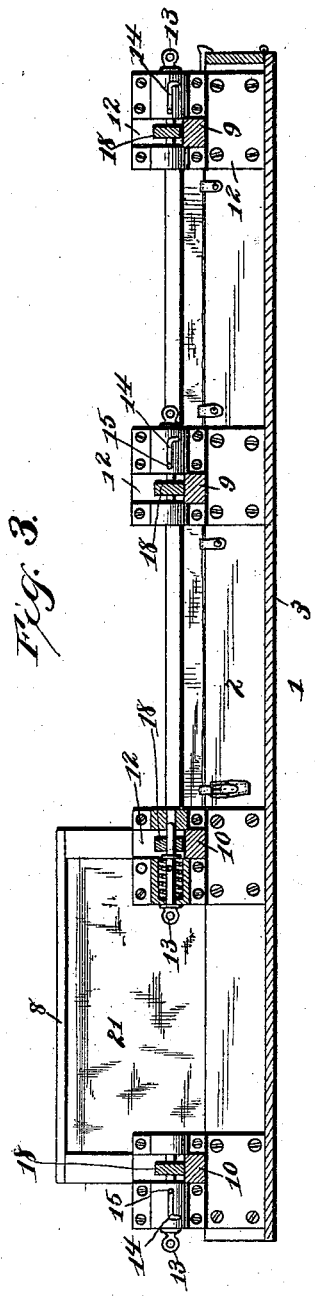
Witnesses  Inventor
 J. W. Scott
By his Attorneys,

UNITED STATES PATENT OFFICE.

JOHN W. SCOTT, OF TONICA, ILLINOIS.

HAY-RACK.

SPECIFICATION forming part of Letters Patent No. 494,695, dated April 4, 1893.

Application filed February 24, 1892. Serial No. 422,680. (No model.)

*To all whom it may concern:*

Be it known that I, JOHN W. SCOTT, a citizen of the United States, residing at Tonica, in the county of La Salle and State of Illinois, have invented a new and useful Hay-Rack, of which the following is a specification.

The invention relates to improvements in racks for grain.

The object of the present invention is to provide a simple and inexpensive rack which will be adapted to be readily separated and assembled, and which will prevent the loss of the seeds shaken from the grain being carried, and which will cause the seeds to be accumulated for convenient removal from the rack.

The invention consists in the construction and novel combination and arrangement of parts hereinafter fully described, illustrated in the accompanying drawings, and pointed out in the claims hereto appended.

In the drawings—Figure 1 is a perspective view of a rack constructed in accordance with this invention. Fig. 2 is a transverse sectional view. Fig. 3 is a longitudinal sectional view.

Like numerals of reference indicate like parts in all the figures of the drawings.

1 designates a body-portion, composed of side-sills 2, and a bottom 3, and having detachably secured to it side sections 4, and wheel-sections 5, which are raised above the side-sections 4 to accommodate themselves to the wheels. The side and wheel sections are composed of longitudinal slats 7 and 8, and each has transverse bars 9 and 10, the inner ends of which extend inward over the body and through openings 11 in castings 12, and are secured in the castings by spring-actuated bolts 13. The spring-actuated bolts are arranged in suitable casings, which are provided with bayonet-slots 14, for the reception of pins 16, of the bolts to hold the latter out of engagement with the transverse bars. The openings of the castings are provided with vertical extensions 17, to receive blocks 18, of the transverse bars. The inner ends are arranged in openings 19 of eye-plates 20, which are secured to the body near the middle of the same. By this construction the side and wheel sections of the rack may be readily detached when desired. The seed or grains of the grain carried by the rack shaken from the load are caught by aprons 21, which are constructed of suitable fabric or leather, and which extend under the side-sections and wheel-sections of the rack to direct the seed and grains shaken from the load into the body of the rack. The aprons are detachably secured to the sections of the rack by means of straps and buckles or straps and eyes, or any other suitable means.

It will be seen that the sections of the rack are securely retained in place, that they may be readily detached when desired, and that the grains and seeds shaken from the load are collected and delivered into the body of the rack from where they may be readily removed for planting.

What I claim is—

1. In a hay-rack, the combination of a body-portion, castings mounted on the sides of the body-portion and provided with openings, spring-actuated bolts mounted on the castings, and the side and wheel-section having transverse bars arranged in the openings of the castings and adapted to be engaged by the bolts, substantially as described.

2. In a rack, the combination of a body-portion provided with eye-plates arranged near its middle, castings arranged at the sides of the body-portion and provided with openings, the side and wheel-sections having transverse bars arranged in the openings of the casting and in the eye-plates and provided with blocks arranged in the castings, and bolts mounted on the castings and engaging the transverse bars and securing the sections to the body, substantially as described.

In testimony that I claim the foregoing as my own I have hereto affixed my signature in the presence of two witnesses.

JOHN W. SCOTT.

Witnesses:
S. A. H. SCOTT,
R. M. PHILLIPS.